(12) United States Patent
Becker et al.

(10) Patent No.: US 6,776,605 B2
(45) Date of Patent: Aug. 17, 2004

(54) MOLD MOUNTING PLATE OF AN INJECTION MOLDING MACHINE

(75) Inventors: Klaus Becker, Wetter (DE); Guido Legewie, Herne (DE)

(73) Assignee: Mannesmann Plastics Machinery GmbH, München (DE)

( * ) Notice: Subject to any disclaimer, the term of this patent is extended or adjusted under 35 U.S.C. 154(b) by 0 days.

(21) Appl. No.: 10/236,518

(22) Filed: Sep. 6, 2002

(65) Prior Publication Data
US 2003/0049347 A1 Mar. 13, 2003

(30) Foreign Application Priority Data
Sep. 12, 2001 (DE) .......................................... 101 44 992

(51) Int. Cl.$^7$ ............................................. B29C 45/64
(52) U.S. Cl. ...................................... 425/589; 425/595
(58) Field of Search ................................. 425/589, 594, 425/595

(56) References Cited

U.S. PATENT DOCUMENTS

| | | | |
|---|---|---|---|
| 5,593,711 A | 1/1997 | Glaesener | |
| 6,027,329 A | * 2/2000 | Nazarian et al. | ............ 425/589 |

* cited by examiner

Primary Examiner—Tim Heitbrink
(74) Attorney, Agent, or Firm—Henry M. Feiereisen

(57) ABSTRACT

A mold mounting plate of an injection molding machine, in particular for plastic, includes a baseplate having a front face for receiving a mold. The weight of the mold mounting plate can be reduced by arranging a dome-shaped element with its base on the backside of the baseplate opposite the front side for supporting the baseplate. Such mold mounting plate is easy to manufacture as a single cast part.

18 Claims, 3 Drawing Sheets

MOLD MOUNTING PLATE OF AN INJECTION MOLDING MACHINE

CROSS-REFERENCES TO RELATED APPLICATIONS

This application claims the priority of German Patent Application, Serial No. 101 44 992.5, filed Sep. 12, 2001, pursuant to 35 U.S.C. 119(a)–(d), the subject matter of which is incorporated herein by reference.

BACKGROUND OF THE INVENTION

The present invention relates to a mold mounting plate of an injection molding machine.

U.S. Pat. No. 5,593,711 discloses a mold mounting plate for a plastic injection molding machine which consists essentially of a backplate, a center section formed as a half-pipe or a frustrated cone, and a baseplate extending parallel to the backplate for receiving the mold. The backplate has in its corner regions openings for receiving four columns of an injection molding machine. The center section, which is formed as a hollow body, it is arranged with its base in the center of the backplate. The baseplate for the mold is located adjacent to the tip of the frustrated cone or the half-pipe. The baseplate is hence supported by the center part only in its center region.

The aforedescribed mold mounting plate is intended to reduce the weight of the plate and the deformation of the plate under the pressing force during the injection molding process, thereby preventing the mold halves from opening. However, a finite element analysis has shown that such mold mounting plates which are formed as so-called trusses, i.e., which introduce the load like a roof ridge diagonally to a base, are disadvantageous for static reasons.

The same U.S. patent describes in the background section another mold mounting plate for an injection molding machine, which essentially consists of two plates, namely a baseplate and a backplate. The baseplate is here connected by a rib-like structure with a backplate that is parallel to the baseplate. The backplate has a smaller surface area than the baseplate, so that the mold mounting plate has a slightly roof-shaped cross-section. The rectangular mold mounting plate has at each of its corner an opening for receiving the columns of an injection molding machine. The rib-like structure of the mold mounting plate which is essentially formed of a plurality of ribs and slots, is primarily intended to support the weight of the mold mounting plate.

Since the baseplate of the mold mounting plate is under pressure during the injection molding process, the rib-like structure causes the backplate to be under tension. Accordingly, the mold mounting plate yields so that the columns located in the openings are displaced inwardly on the side of the baseplate and are subjected to a bending stress.

It would therefore be desirable to provide to a stable mold mounting plate for an injection molding machine which obviates prior art shortcomings and is simple in structure and is easy to manufacture.

SUMMARY OF THE INVENTION

According to one aspect of the present invention, a mold mounting plate of an injection molding machine, in particular for plastic injection molding, includes a baseplate with a front side for receiving a mold and a dome-shaped element having a base that is arranged on the backside of the baseplate opposite the front side to support the baseplate. In this way, a particularly light and rigid construction is achieved. Such a mold mounting plate minimizes torque transmission to the column-like holding and/or guide elements of an injection molding machine as a result of the deformation of the mold mounting plate.

Advantageous embodiments may include one or more of the following features. The dome-shaped element can be symmetric and arranged centrally on the backside of the baseplate. To facilitate receiving an injection unit of the plastic injection molding machine, the dome-shaped element has a recess disposed in the region of its apex wherein the recess extends in the direction of the baseplate all to way to the baseplate. The dome-shaped element has a tapered section in the direction of the baseplate, with the tapered section being symmetric to the center of the baseplate. The ring-shaped tapered section promotes a stable support of the center of the baseplate in spite of the opening provided for the injection unit. The substantially narrow shape of the tapered section and the massive size of the dome-shaped element in the region of the tapered section support the foundation of the baseplate. In this way, the pressing forces can be transmitted directly from the baseplate to the dome-shaped element.

For reducing the weight, the dome-shaped element can include ribs with recesses formed in the marginal region of the baseplate, wherein the ribs can be oriented outwardly and parallel to the edges of the baseplate. In addition, in the region of the recesses, the wall of the dome-shaped element can be arranged perpendicular to the baseplate and window-shaped openings can be arranged in the wall of the dome-shaped element in the region of the recesses as well as between the ribs. The ribs can also be arranged perpendicular to the baseplate in the region of the recesses.

Openings can also be provided in the baseplate for receiving columnar holding and/or guide elements of an injection molding machine. The openings can be arranged outside the dome-shaped element, and sleeves, which can be shaped as parallelepipeds, can be disposed adjacent to the openings for receiving to the columnar holding and/or guide elements. The sleeves are thus elastically connected to the baseplate and can bend, providing some compensation in the alignment. The baseplate is preferably four-sided, with an opening disposed in each corner region.

To provide sufficient rigidity of the baseplate for longer mold mounting plates also in the region of the marginal edges, two space-apart ribs are arranged between each of the sleeves.

The weight can be further reduced by disposing a cavity, which is separated by an intermediate wall extending through the center of and perpendicular to the baseplate, between the dome-shaped element and the baseplate. Preferably, the intermediate wall extends parallel to the marginal edge of the four-sided baseplate and, for a rectangular baseplate, parallel to the shorter marginal edge of the baseplate. This increases in the stability of the baseplate, thereby providing sufficient rigidity also for longer mold mounting plates. In addition, the mold mounting plate can be cast with only two lost cores, which is more economical.

For static considerations, the dome-shaped element can advantageously transition into the sleeves in the corner regions of the baseplate, wherein the sleeves can have a smaller height that the maximum height of the dome-shaped element as measured relative to the baseplate. The radius of the dome-shaped element can correspond approximately to the spacing between the axes of the columnar holding and/or guide elements. Advantageously, the baseplate, the dome-shaped element, the sleeves, and the ribs are formed as a single cast part.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
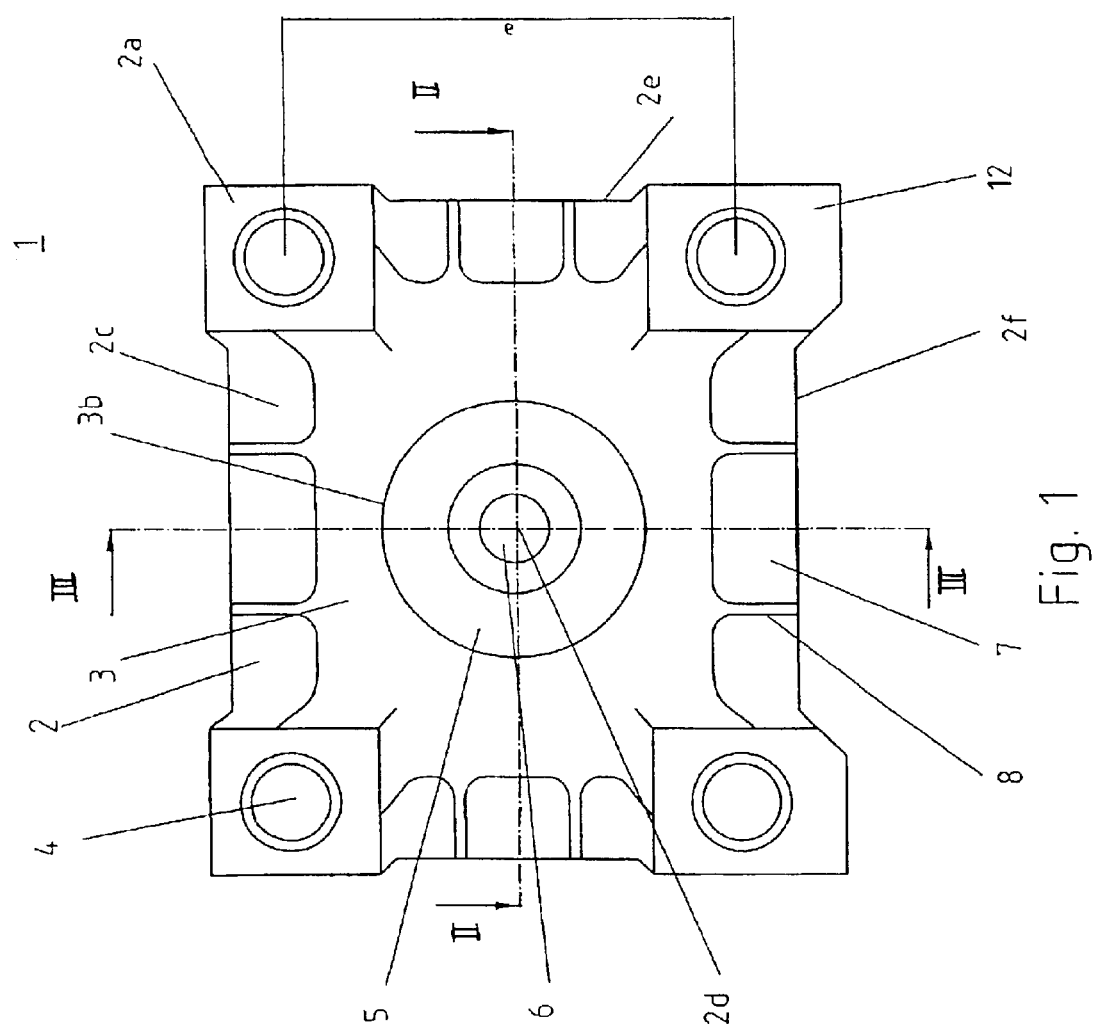
FIG. 1 is a view of the backside of a mold mounting plate according to the present invention.

Throughout all the Figures, same or corresponding elements are generally indicated by same reference numerals.

Turning now to the drawing, and in particular to FIG. 1, there is shown a view onto a backside of an exemplary mold mounting plate 1 of an injection molding machine for plastic. The mold mounting plate 1 is made essentially of a rectangular baseplate 2 and a dome-shaped element 3 arranged in its center (see also FIGS. 2 and 3). Opening 4 are arranged in each of the corner regions 2a of the baseplate 2, wherein holding and/or guide elements (not shown) of an injection molding machine can be inserted into the openings 4.

Figure 2:
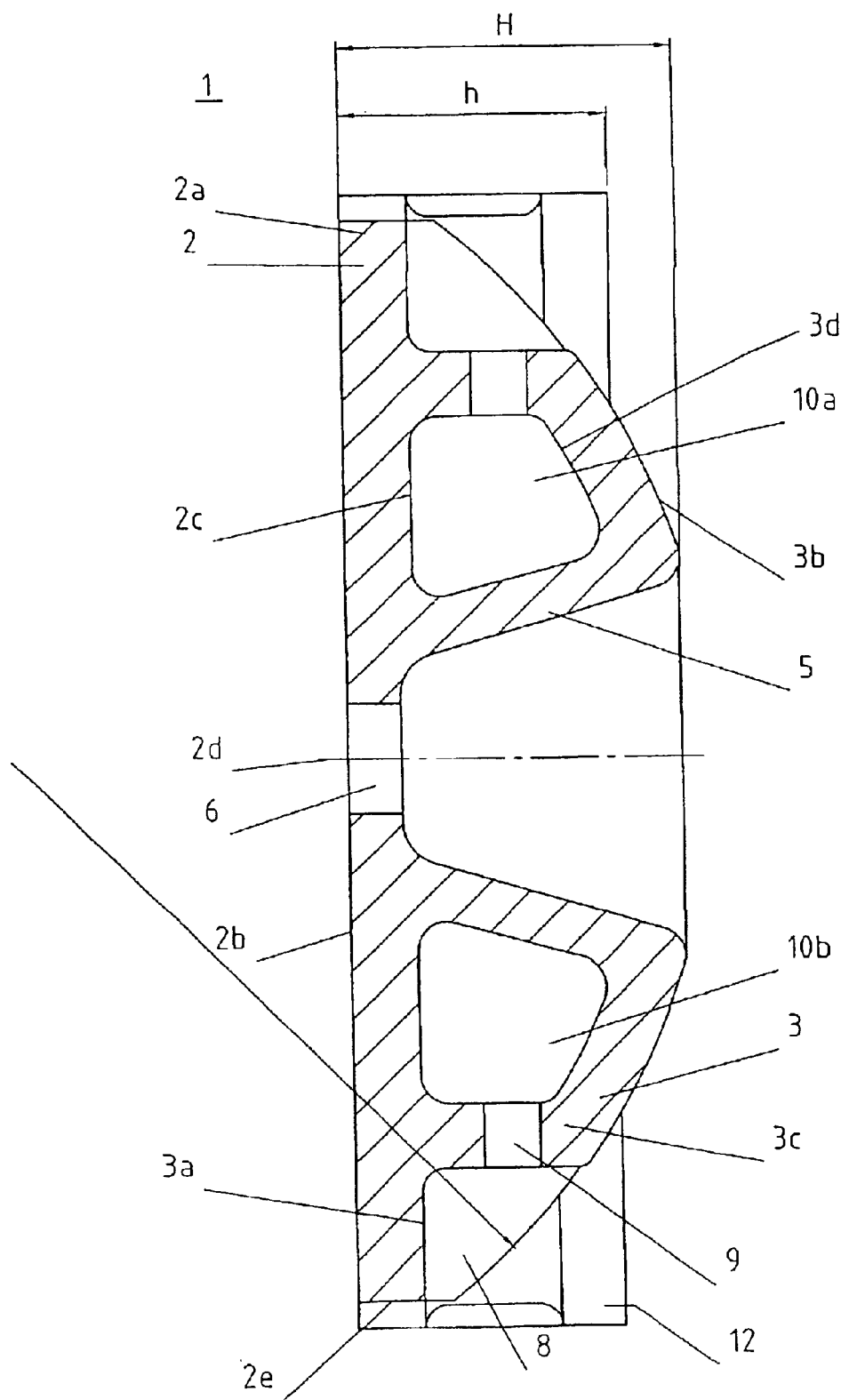
FIG. 2 is a cross-section of the mold mounting plate, taken along the line II—II of FIG. 1.

As seen in FIG. 2, which shows a cross-section of FIG. 1 taken along the line II—II, the dome-shaped element 3 has a symmetric shape and transitions with its base 3a into the backside 2c of the baseplate 2. The radius r of the dome-shaped element 3 thereby corresponds approximately the distance between the two openings 4 in the baseplate 2 parallel to the edge 2e which is shorter than edge 2f. In the region of the apex tip 3b of the dome-shaped element 3, the dome-shaped element 3 has a tapered section 5 which points towards the baseplate 2 and extends to the baseplate 2, so that the taper facing the baseplate 2 transitions into the baseplate 2. The round, funnel-shaped section 5 is oriented symmetrical to the center 2d of the baseplate 2 and is tapered in the direction of the baseplate 2. The tapered section 5 is adapted to receive the injection unit (not shown) of the plastic injection molding machine and is configured as narrow as possible, depending on the injection unit, so as to properly support the baseplate 2. Adjacent to the tapered section 5 is a bore 6 through which the tip of the injection unit (not shown) passes to the mold half (not shown) that is secured to the front face 2b of the baseplate 2.

As also seen in FIG. 1, recesses 7 are provided in the dome-shaped element 3 in the region of the edges 2e and 2f of the baseplate 2, with ribs 8 supporting the baseplate 2 between the openings 4. The ribs 8 are oriented perpendicular to the baseplate (see FIGS. 2 and 3) and also perpendicular to the edge 2e and 2f, on which the ribs are arranged.

FIG. 2 shows with respect to the recesses 7, that window-like openings 9 are arranged in the wall that separates the dome-shaped element 3 from the respective edge 2e and 2f, and consequently also between the ribs 8. The walls 3c that connect the ribs on their ends facing away from the marginal edges 2e and 2f are, like the ribs 8, also oriented perpendicular to the baseplate 2. When viewed from the side, the rib 8 has an essentially triangular form that matches the contour of the dome-shaped element 3.

A cavity 10a and 10b remains between the backside 2b of the baseplate 2 and the interior face 3d of the dome-shaped element 3, with the cavity being connected with the window-shaped openings 9. The cavity 10a and 10b is divided into two sections 10a and 10b by an intermediate wall 11 which connects the backside 2b of the baseplate 2 with the interior face 3d of the dome-shaped element 3.

Figure 3:
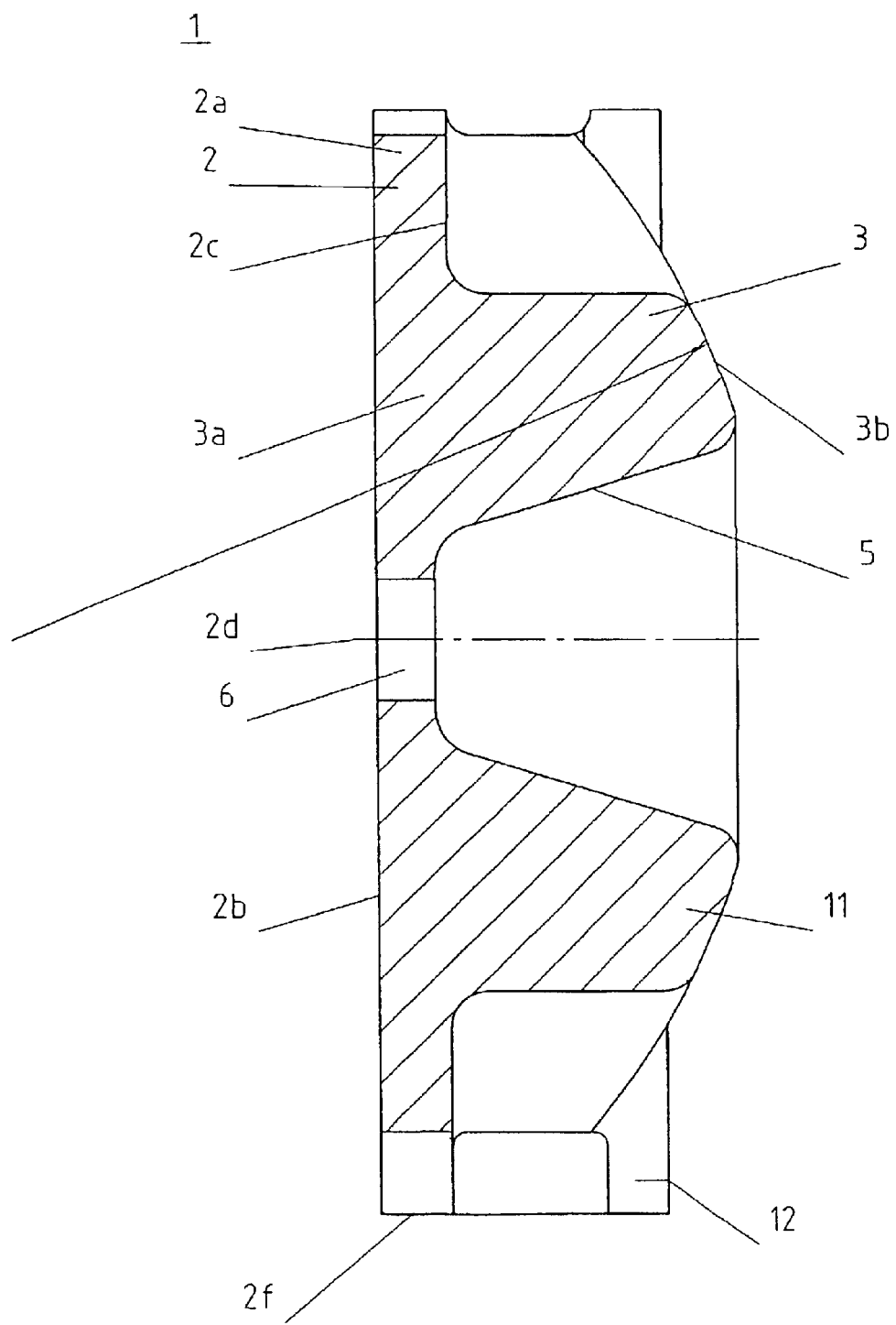
FIG. 3 is a cross-section of the mold mounting plate, taken along the line III—III of FIG. 1.

The intermediate wall 11, which is depicted in FIG. 3 as a cross-sectional view taken along the line III—III of FIG. 1, is oriented perpendicular to the baseplate 2 and extends through the center 2d of the baseplate 2. The intermediate wall 11 also extends parallel to the shorter edge 2e of the baseplate 2.

As also shown in FIGS. 1 to 3, sleeves 12 in the form of parallelepipeds, into which the holding and/or guide elements (not shown) can be inserted, are arranged subsequent to the openings 4. The height h of the sleeves is smaller than the maximum height H of the dome-shaped element 3 as measured from the baseplate 2. As shown clearly in FIG. 1, the sleeves 12 transition smoothly into the dome-shaped element 3. The lower sections of the sleeves 12 visible in FIG. 1 extend slightly in the downward direction so as to form a spacer surface for the mold mounting plate on the frame (not shown) of the injection molding machine.

The design of the mold mounting plate 1 with the baseplate 2, the dome-shaped element 3, the ribs 8, and the sleeves 12 allows the mold mounting plate 1 to be easily fabricated as a single cast part, in particular a cast steel part. The mold mounting plate 1 can hence be constructed in a very simple manner.

The aforedescribed mold mounting plate 1 can be used in a horizontal dual-mold injection molding machine for plastics. Such injection molding machine has typically a stationary mold mounting plate 1 and a movable mold mounting plate 1 that can be moved via a closing unit. The closing unit can have stationary spindles arranged in the corner regions of a mold mounting plate, with the other mold mounting plate 1 being movable along the closing unit via ball screw drives attached to the spindles.

While the invention has been illustrated and described in connection with preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A mold mounting plate of an injection molding machine, comprising:

a baseplate having a front side for receiving a mold and a backside opposite the front side, the baseplate including openings adapted to receive columnar holding or guide elements of the injection molding machine;

a dome-shaped element having a base, said base transitioning into the backside of the baseplate, with the openings in the baseplate being disposed outside the dome-shaped element; and sleeves disposed adjacent to the openings for receiving the columnar holding or guide elements.

2. The mold mounting plate of claim 1, wherein the dome-shaped element has a symmetric shape and is arranged centrally on the backside of the baseplate.

3. The mold platen of claim 1, wherein the dome-shaped element has an apex and is a recess disposed in the region of the apex, said recess extending towards the baseplate and terminating at the baseplate.

4. The mold platen of claim 3, wherein the dome-shaped element is tapered in the direction of the baseplate and is symmetric with respect to the center of the baseplate.

5. The mold platen of claim 1, wherein the dome-shaped element includes ribs with recesses formed in a marginal region of the baseplate, with the ribs oriented outwardly and parallel to edges of the baseplate.

6. The mold mounting plate of claim 5, wherein the dome-shaped element further includes a wall, with the wall being arranged perpendicular to the baseplate proximate to the recesses, and wherein window-shaped openings are disposed in the wall of the dome-shaped element proximate to the recesses as well as between the ribs.

7. The mold mounting plate of claim 1, wherein the sleeves are shaped as a parallelepiped.

8. The mold mounting plate of claim 1, wherein at least two ribs are arranged in space-apart disposition between the sleeves.

9. A mold mounting plate of an injection molding machine, comprising:

a baseplate having a front side for receiving a mold and a backside opposite the front side;

a dome-shaped element having a base attached to the backside of the baseplate for supporting the baseplate;

a cavity disposed between the dome-shaped element and the baseplate, and an intermediate wall extending through a center of the baseplate and perpendicular to the baseplate, with the intermediate wall subdividing the cavity into two cavity sections.

10. The mold mounting plate of claim 9, wherein the baseplate is four-sided and the intermediate wall extends parallel to a marginal edge of the four-sided baseplate.

11. The mold mounting plate of claim 10, wherein the baseplate is rectangular and the intermediate wall extends parallel to a shorter marginal edge of the baseplate.

12. The mold mounting plate of claim 1, wherein the dome-shaped element transitions into the sleeves in corner regions of the baseplate.

13. The mold mounting plate of claim 1, wherein the sleeves have a smaller height that a maximum height of the dome-shaped element as measured with reference to the baseplate.

14. The mold mounting plate of claim 1, wherein a radius of the dome-shaped element corresponds approximately to a spacing between the openings in the baseplate disposed parallel to a shorter edge of the baseplate.

15. The mold platen of claim 1, wherein the baseplate is four-sided and includes corners and wherein an opening is disposed at each corner of the baseplate.

16. The mold mounting plate of claim 8, wherein the baseplate, the dome-shaped element, the sleeves, and the ribs are formed as a single cast part.

17. The mold mounting plate of claim 9, wherein the dome-shaped element transitions into sleeves in corner regions of the baseplate.

18. The mold mounting plate of claim 9, wherein a radius of the dome-shaped element corresponds approximately to a spacing between the openings in the baseplate disposed parallel to a shorter edge of the baseplate.

* * * * *